US008280830B2

(12) United States Patent
Kennedy

(10) Patent No.: US 8,280,830 B2
(45) Date of Patent: Oct. 2, 2012

(54) SYSTEMS AND METHODS FOR USING MULTIPLE IN-LINE HEURISTICS TO REDUCE FALSE POSITIVES

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 621 days.

(21) Appl. No.: 12/550,880

(22) Filed: Aug. 31, 2009

(65) Prior Publication Data

US 2011/0055123 A1 Mar. 3, 2011

(51) Int. Cl.
*G06N 5/00* (2006.01)
(52) U.S. Cl. ............................................. 706/12; 706/45
(58) Field of Classification Search ...................... 706/12, 706/45
See application file for complete search history.

(56) References Cited

U.S. PATENT DOCUMENTS 6,067,535 A 5/2000 Hobson et al.

OTHER PUBLICATIONS

Vincent, et al., MDS Misuse Detection System, Information Society Technologies, Contract No. 26459, 2006, pp. 1-115.*
Search Report and Written Opinion Received in related International Application No. PCT/US2010/046440.
Shlomo Hershkop et al., "Combining Email Models for False Positive Reduction"; Proceedings of the eleventh ACM SIGKDD international conference on knowledge discovery in data mining; Dec. 31, 2005.
William Arnold et al., "Automatically generated WIN32 heuristic virus detection"; Virus Bulletin Conference; Sep. 30, 2000.
Ender Ozcan et al., "A Comprehensive Analysis of Hyper-heuristics"; Journal Intelligent Data Analysis, vol. 1, No. 1; Jan. 31, 2008.

* cited by examiner

*Primary Examiner* — Wilbert L Starks
(74) *Attorney, Agent, or Firm* — Advantedge Law Group

(57) ABSTRACT

An exemplary method for using multiple in-line heuristics to reduce false positives may include: 1) training a first heuristic using a set of training data, 2) deploying the first heuristic, 3) identifying false positives produced by the first heuristic during deployment, 4) modifying the training data to include the false positives produced by the first heuristic, 5) creating a second heuristic using the modified training data, 6) deploying both the first heuristic and the second heuristic, and then 7) applying both the first heuristic and the second heuristic, in sequence, to a set of field data.

20 Claims, 8 Drawing Sheets

SYSTEMS AND METHODS FOR USING MULTIPLE IN-LINE HEURISTICS TO REDUCE FALSE POSITIVES

BACKGROUND

Decision trees and other heuristics are commonly used as predictive models to map observations about an item with conclusions about the item's target value. For example, a security-software vendor may use decision trees as predictive models for identifying malicious computer files ("malware") based on attributes, characteristics, and/or behaviors of the files.

Decision trees and other heuristics may be trained and refined using a corpus of known samples. For example, a security-software vendor may train a malware-detection heuristic by applying the heuristic to a corpus of samples containing known-malicious files and known-legitimate files.

The accuracy of a heuristic is often limited by the size of the corpus of samples used to train the heuristic. As such, heuristics commonly generate false negatives and/or false positives upon being deployed and used in the real world. In order to improve the accuracy of a heuristic, heuristic providers typically: 1) add the misclassified samples to the corpus of samples used to train the heuristic, 2) re-train the heuristic using the modified corpus of samples, and then 3) redeploy the re-trained heuristic.

However, even if a heuristic is re-trained using a corpus of samples that includes misclassified samples gathered from the field, re-trained heuristics commonly produce new false positives upon being redeployed in the field. Because of this, heuristic providers may have to constantly redeploy and retest a heuristic until satisfactory performance is obtained. Unfortunately, the amount of time required to identify misclassified samples, incorporate these misclassified samples into the corpus of samples used to train a heuristic, and then re-train the heuristic may represent a prohibitively costly and/or lengthy undertaking. As such, the instant disclosure identifies a need for systems and methods for quickly and effectively reducing the number of false positives generated by heuristics.

SUMMARY

As will be described in greater detail below, the instant disclosure generally relates to systems and methods for using multiple in-line heuristics to reduce false positives. In one example, the systems and methods disclosed herein may accomplish this task by: 1) training a first heuristic (such as a malware-detection decision tree) using a set of training data, 2) deploying the first heuristic, 3) identifying false positives produced by the first heuristic in the field (i.e., during deployment), 4) modifying the training data to include the false positives produced by the first heuristic, 5) creating a second heuristic using the modified training data, 6) deploying both the first heuristic and the second heuristic, and then 7) applying both the first heuristic and the second heuristic, in sequence, to a set of field data.

As will be described in greater detail below, by applying both the first heurist and the second heuristic in sequence, the systems and methods described herein may effectively reduce the number of false positives collectively produced by these heuristics. For example, while the second heuristic may have false-positive characteristics that are different from the first heuristic (e.g., the second heuristic may, due to differences between it and the first heuristic, produce a false positive on a sample that was correctly classified by the first heuristic), applying both heuristics in sequence may prevent these two heuristics, collectively, from producing additional false positives that the first heuristic would not also have produced.

As such, the various systems and methods disclosed herein may improve the overall accuracy of a heuristic without negatively impacting its false-positive rate. Moreover, because developers may immediately deploy the refined (i.e., "second") heuristic without having to field test the same, these systems and methods may enable developers to quickly and effectively reduce the number of false positives produced by heuristics without significantly increasing development time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
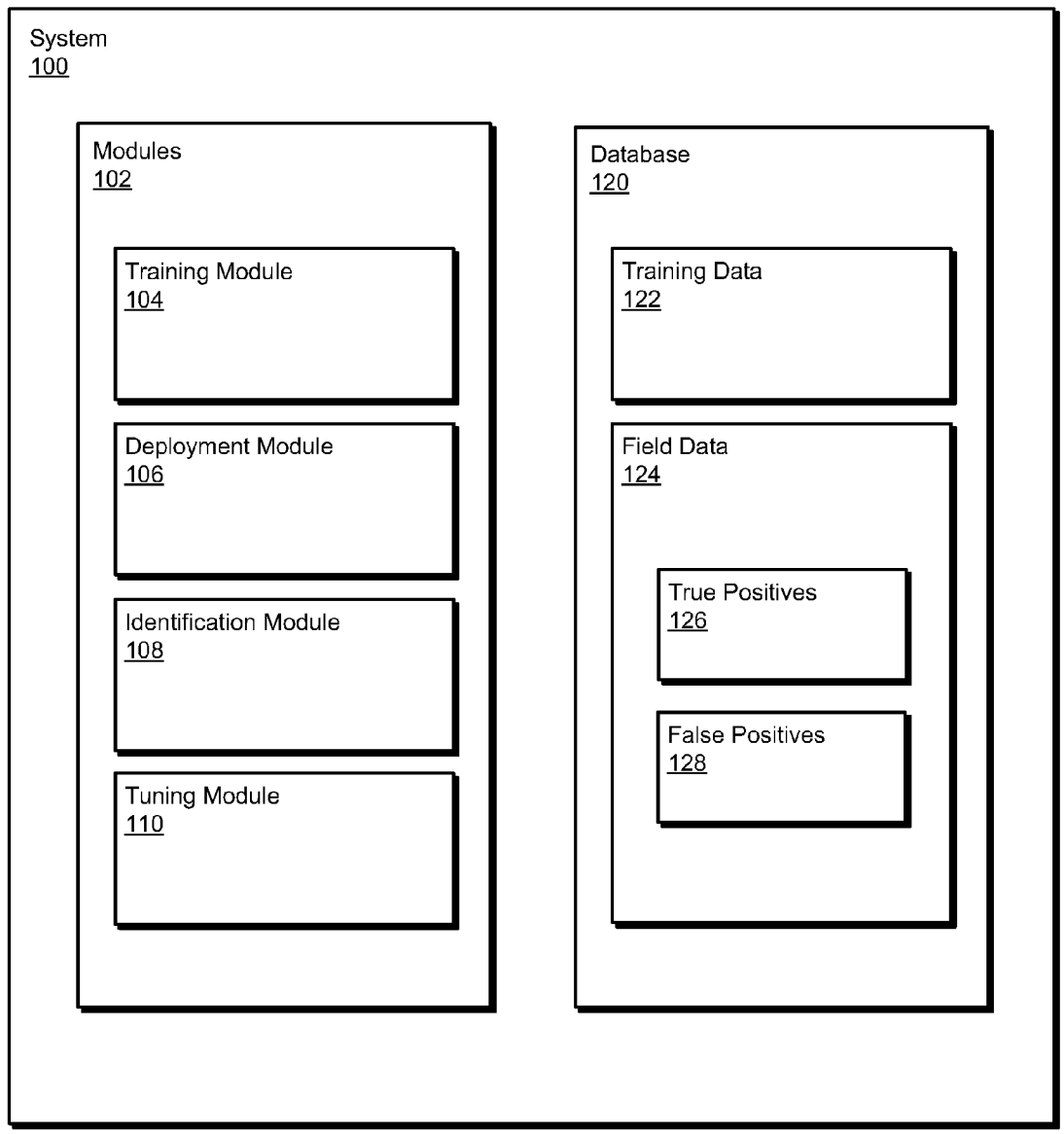
FIG. 1 is a block diagram of an exemplary system for using multiple in-line heuristics to reduce false positives.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using multiple in-line heuristics to reduce false positives. In one example, the systems and methods disclosed herein may accomplish this task by: 1) training a first heuristic (such as a malware-detection decision tree) using a set of training data, 2) deploying the first heuristic, 3) identifying false positives produced by the first heuristic in the field (i.e., during deployment), 4) modifying the training data to include the false positives produced by the first heuristic, 5) creating a second heuristic using the modified training data, 6) deploying both the first heuristic and the second heuristic, and then 7) applying both the first heuristic and the second heuristic, in sequence, to a set of field data.

The term "heuristic algorithm," or often simply "heuristic," as used herein, generally refers to any type or form of algorithm, formula, model, or tool that may be used to classify, or make decisions with respect to, an object or sample. In some examples, the various heuristics described herein may represent, without limitation, decision trees and other algorithms designed to detect and/or identify malware.

In addition, the terms "false positive" and "true positive" generally represent possible outcomes of a decision process, such as a heuristic. In particular, a "false positive" may represent an error made in rejecting a null hypothesis when the null hypothesis is actually true. For example, a malware-detection heuristic may produce a false positive by incorrectly determining that a legitimate file or software application is malicious. Conversely, a "true positive" may represent a correct decision in accepting a null hypothesis as true. For example, a malware-detection heuristic may produce a true positive by correctly determining that a legitimate file or software application is legitimate.

Figure 2:
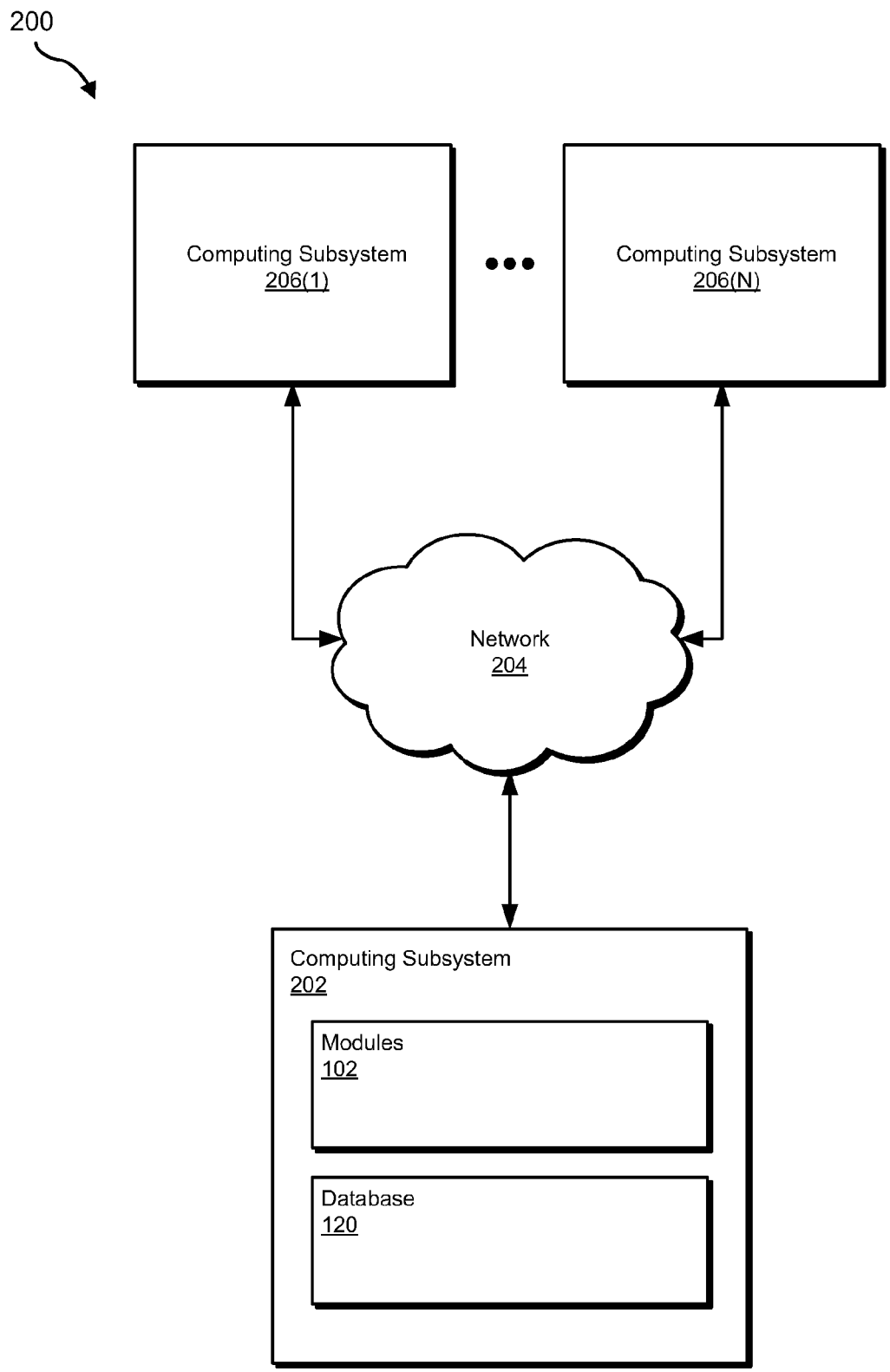
FIG. 2 is a block diagram of an exemplary system for using multiple in-line heuristics to reduce false positives.

The following will provide, with reference to FIGS. 1-2, detailed descriptions of exemplary systems for using multiple in-line heuristics to reduce false positives. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for using multiple in-line heuristics to reduce false positives. As illustrated in this figure, exemplary system 100 may include one or more modules 102 for performing one or more tasks. For example, and as will be explained in greater detail below, exemplary system 100 may include a training module 104 programmed to train heuristics. Exemplary system 100 may also include deployment module 106 programmed to deploy heuristics within a community or enterprise.

In addition, and as will be described in greater detail below, exemplary system 100 may include an identification module 108 programmed to identify false positives and true positives produced by heuristics during deployment. Exemplary system 100 may also include a tuning module programmed to: 1) modify training data to include results from the field and 2) create additional heuristics using this modified training data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystems 202 and 206(1)-206(N)), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases 120. Database 120 may represent a portion of a single database or computing device or a plurality of databases or computing devices. In one embodiment, database 120 may be configured to store training data 122 and field data 124. As will be explained in greater detail below, training data 122 may represent a corpus of known samples that may be used to train heuristics. In contrast, field data 124 may represent data (gathered from computing systems on which a heuristic has been deployed) that identifies or contains: 1) a corpus of samples classified by the heuristic and/or 2) classifications assigned to these samples by the heuristic.

Database 120 in FIG. 1 may represent a portion of one or more computing devices. For example, database 120 may represent a portion of computing subsystems 202 and 206(1)-206(N) in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as computing subsystems 202 and 206(1)-206(N) in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, exemplary system 200 may include a computing subsystem 202 in communication with computing subsystems 206(1)-206(N) via a network 204. In one embodiment, and as will be described in greater detail below, modules 102 on computing device 202 may be programmed to: 1) train a first heuristic using a set of training data, 2) deploy the first heuristic (e.g., on computing subsystems 206(1)-206(N), as explained below), 3) identify false positives produced by the first heuristic during deployment, 4) modify the training data to include the false positives produced by the first heuristic, 5) create a second heuristic using the modified training data, 6) deploy both the first heuristic and the second heuristic (e.g., on computing subsystems 206(1)-206(N), as explained below), and then 7) apply both the first heuristic and the second heuristic, in sequence, to a set of field data (e.g., on computing subsystems 206(1)-206(N), as explained below).

Computing subsystems 202 and 206(1)-206(N) generally represent any type or form of computing device capable of reading computer-executable instructions. Examples of computing subsystems 202 and 206(1)-206(N) include, without limitation, laptops, desktops, servers (application servers and database servers configured to provide various database services and/or run certain software applications), cellular phones, personal digital assistants (PDAs), multimedia players, embedded systems, combinations of one or more of the same, exemplary computing system 710 in FIG. 7, or any other suitable computing device.

In one example, computing subsystem 202 may represent a server or backend configured to create and deploy heuristics to computing subsystems 206(1)-206(N). In this example, computing subsystems 206(1)-206(N) may represent all or a portion of a single community or a plurality of communities. For example, computing subsystems 206(1)-206(N) may represent computing systems within a single or a plurality of user bases, a single or a plurality of enterprises, or portions or combinations of one or more of the same.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing subsystems 202 and 206(1)-206(N).

Figure 3:
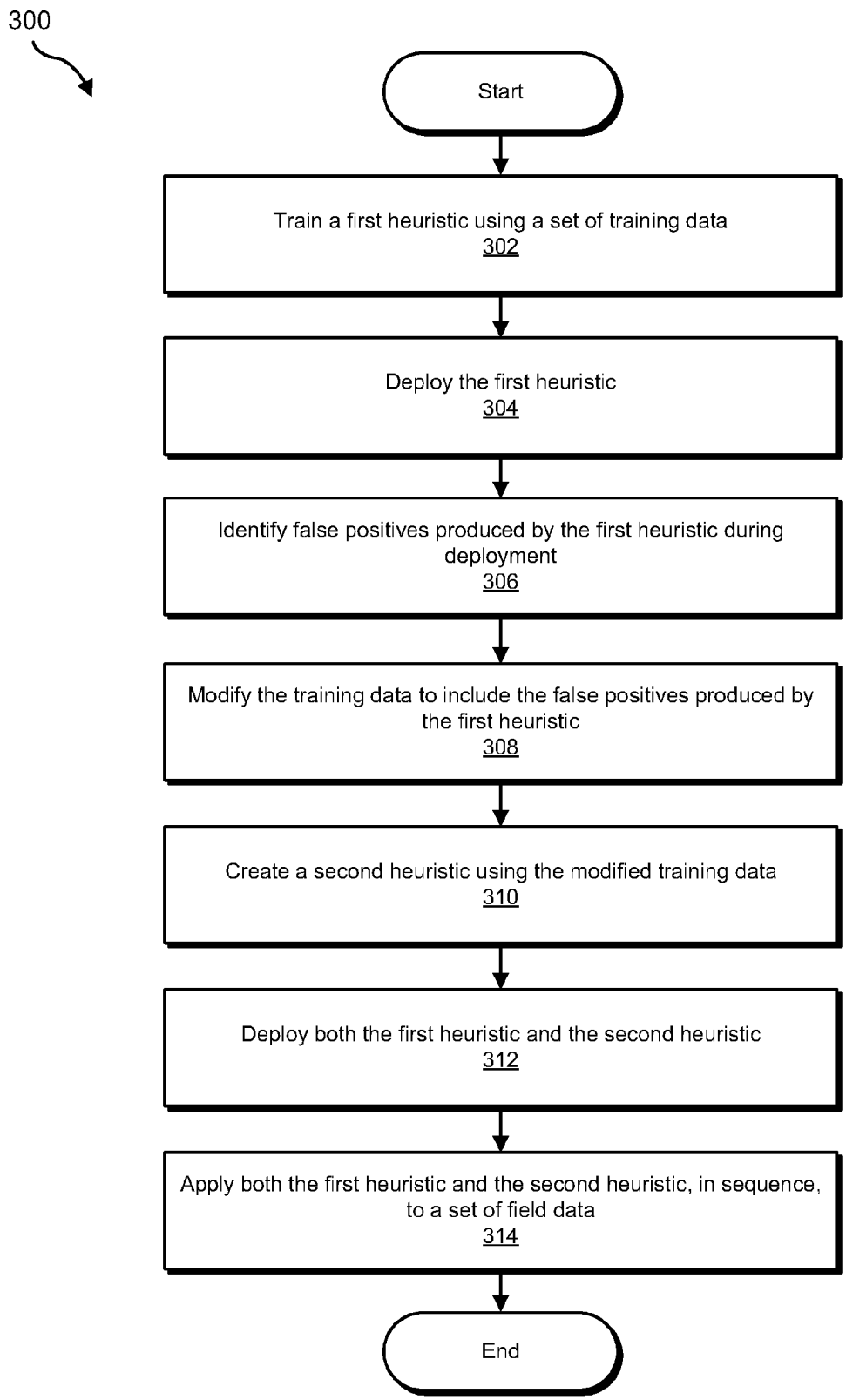
FIG. 3 is a flow diagram of an exemplary method for using multiple in-line heuristics to reduce false positives.

FIG. 3 is a flow diagram of an exemplary computer-implemented method 300 for using multiple in-line heuristics to reduce false positives. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may train a first heuristic using a set of training data. For example, training module 104 in FIG. 1 (which may, as detailed above, represent a portion of computing subsystem 202 in FIG. 2) may train a first heuristic using training data 122. As detailed above, this heuristic (as with all other heuristics described herein) may represent any type or form of decision-based algorithm. In some examples, this heuristic may represent a malware-detection heuristic (such as a decision tree) configured to detect and identify malware.

Training module 104 may train heuristics in a variety of ways. For example, training module 104 may apply an initial version of a heuristic (i.e., a first heuristic) to a corpus of known samples (e.g., training data 122, which may represent a corpus of samples containing known-malicious files and known-legitimate files) in a controlled environment, such as a computer lab. Training module 104 may then determine whether the heuristic correctly classified each sample within the corpus of known samples. If training module 104 determines that the heuristic misclassified an unacceptable number of samples within training data 122, then training module 104 may tweak or modify the underlying algorithm of the heuristic in an attempt to improve its accuracy. Training module 104 may then repeat this process until an acceptable accuracy rate is achieved.

Returning to FIG. 3, at step 304 the various systems described herein may deploy the first heuristic trained in step 302. For example, deployment module 106 in FIG. 1 (which may, as detailed above, represent a portion of computing subsystem 202 in FIG. 2) may deploy the heuristic trained in step 302 from computing subsystem 202 to one or more of computing subsystems 206(1)-206(N) via network 204.

As detailed above, in one example computing subsystem 202 may represent a server or backend configured to train and deploy heuristics to computing subsystems 206(1)-206(N). In this example, computing subsystems 206(1)-206(N) may represent all or a portion of a single community or a plurality of communities. For example, computing subsystems 206(1)-206(N) may represent computing systems within a single or a plurality of user bases, a single or a plurality of enterprises, or portions or combinations of one or more of the same.

At step 306, the various systems described herein may identify false positives produced by the first heuristic during deployment. For example, identification module 108 (which may, as detailed above, represent a portion of computing subsystem 202 in FIG. 2) may identify false positives produced when the first heuristic trained in step 302 was deployed on computing subsystems 206(1)-206(N).

Identification module 108 may identify false positives produced by heuristics during deployment in a variety of ways, including using any of a variety of conventional techniques known in the art. In one example, identification module 108 may receive information (e.g., from the systems in the field on which a heuristic has been deployed) that identifies both the various samples classified by the heuristic and the classifications assigned to these samples by the heuristic. In some cases, this information may also include copies of the samples themselves. Identification module 108 may then analyze this field data in order to determine whether the heuristic correctly classified each sample. In particular, identification module 108 may analyze this field data in order to determine whether the heuristic produced any false positives.

For example, identification module 108 may, as part of computing subsystem 202, receive field data 124 from computing subsystems 206(1)-206(N). In the case of a malware-detection heuristic, field data 124 may identify or contain: 1) the various files on computing subsystems 206(1)-206(N) that were classified by the malware-detection heuristic and 2) the classifications (e.g., "legitimate" or "malicious") that were assigned to these files by the malware-detection heuristic.

Identification module 108 may then analyze field data 124 to determine whether the malware-detection heuristic correctly classified each file. During this analysis, identification module 108 may identify true positives (e.g., legitimate files that were correctly classified as legitimate) and false positives (e.g., legitimate files that were incorrectly classified as malicious) produced by the malware-detection heuristic.

Figure 4:
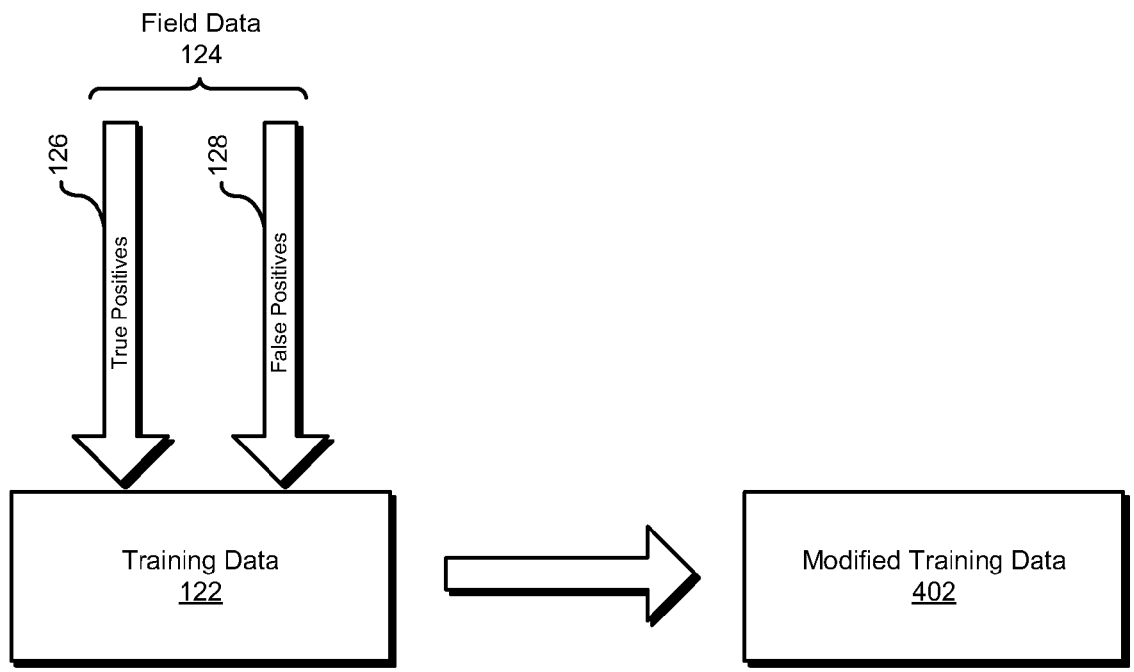
FIG. 4 is a block diagram of an exemplary process for modifying training data to include field data.

Returning to FIG. 3, at step 308 the systems described herein may modify the training data to include the false positives produced by the first heuristic during deployment. For example, as illustrated in FIG. 4, tuning module 110 from FIG. 1 (which may, as detailed above, represent a portion of computing subsystem 202 in FIG. 2) may add the true positives 126 and false positives 128 from field data 124 into the original corpus of samples comprising training data 122.

Returning to FIG. 3, at step 310 the systems described herein may create a second heuristic using the modified training data from step 308. For example, tuning module 110 may, as part of computing subsystem 202, create a second heuristic using modified training data 402 in FIG. 4.

Figure 5:
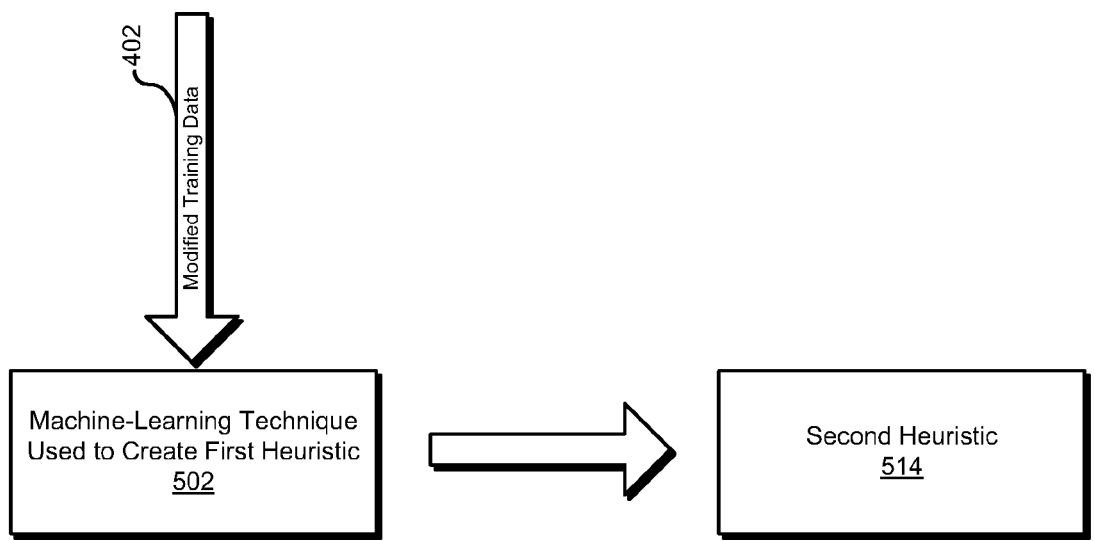
FIG. 5 is a block diagram of an exemplary process for creating a second heuristic using field data.

Tuning module 110 may create this second heuristic in a variety of ways. For example, as illustrated in FIG. 5, tuning module 110 from FIG. 1 may create a second heuristic 514 by applying a machine-learning technique 502 used to create the first heuristic to modified training data 402.

At step 312, the systems described herein may deploy both the first heuristic and the second heuristic. For example, deployment module 106 from FIG. 1 may cause computing subsystem 202 to deploy both first heuristic 512 and second heuristic 514 to computing subsystems 206(1)-206(N) via network 204.

In at least one example, deployment module 106 may deploy second heuristic 514 prior to field testing the same. For example, since, as will be discussed below, deployment module 106 may apply both first heuristic 512 and second heuristic 514 in sequence, deployment module 106 may immediately deploy second heuristic 514 upon creation of the same without having to test and refine this heuristic using field data.

At step 314, the systems described herein may apply both the first heuristic and the second heuristic, in sequence, to a set of field data. For example, deployment module 106 may apply, in sequence, first heuristic 512 and second heuristic 514 in FIG. 5 to a set of field data on computing subsystems 206(1)-206(N).

Figure 6:
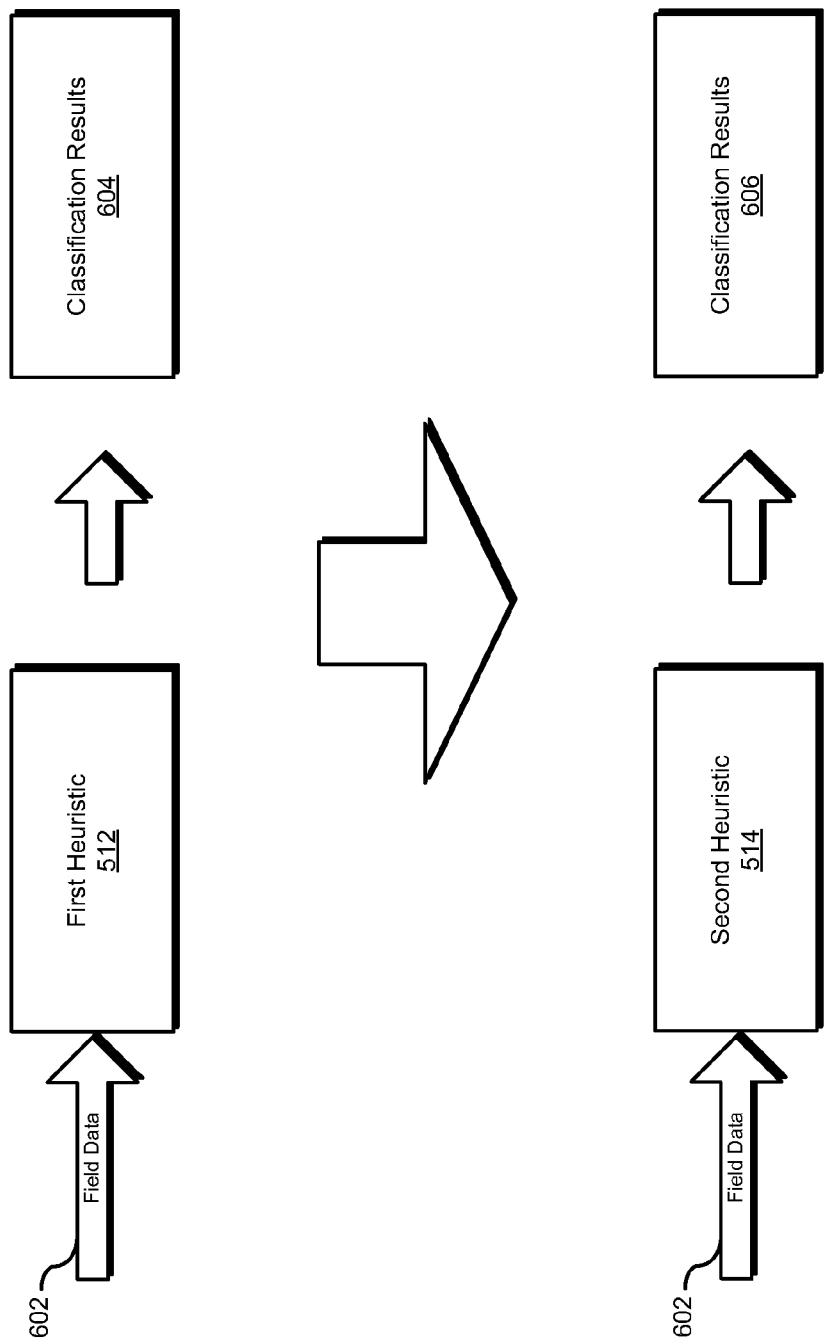
FIG. 6 is a block diagram of an exemplary process for applying multiple heuristics, in sequence, to a set of field data.

The systems described herein may perform step 314 in a variety of ways. In one example, and as illustrated in FIG. 6, deployment module 106 may apply both first heuristic 512 and second heuristic 514 to a set of field data 602 by: 1) applying first heuristic 512 to field data 602 (by, e.g., passing field data 602 through first heuristic 512) and then, upon applying first heuristic 512, 2) applying second heuristic 514 to field data 602 (by, e.g., passing field data 602 through second heuristic 514). Upon completion of step 312, exemplary method 300 in FIG. 3 may terminate.

In some examples, deployment module 106 may compare classification results 604 produced by first heuristic 512 with classification results 606 produced by second heuristic 514 in order to identify and eliminate known false positives. For example, since identification module 108 previously identified the various false positives produced by first heuristic 512 when this heuristic was first deployed in the field (as detailed above in connection with step 306), deployment module 106 may determine whether any of these false positives are contained within classification results 604 and 606 and, if so, may correct or discard the same.

By applying both the first heurist and the second heuristic in sequence, the systems and methods described herein may effectively reduce the number of false positives collectively produced by these heuristics. For example, while the second heuristic may have false-positive characteristics that are different from the first heuristic (e.g., the second heuristic may, due to differences between it and the first heuristic, produce a false positive on a sample that was correctly classified by the first heuristic), applying both heuristics in sequence may prevent these two heuristics, collectively, from producing additional false positives that the first heuristic would not also have produced. That is, by applying these heuristics in sequence, the systems and methods disclosed herein may prevent these heuristics from collectively producing a false positive on a sample that the first heuristic correctly classified.

As such, the systems and methods disclosed herein may improve the overall accuracy of a heuristic without negatively impacting false-positive rates. Moreover, because developers may immediately deploy the second heuristic without having to field test the same, these systems and methods may enable developers to quickly and effectively reduce the number of false positives produced by heuristics without significantly increasing development time.

Figure 7:
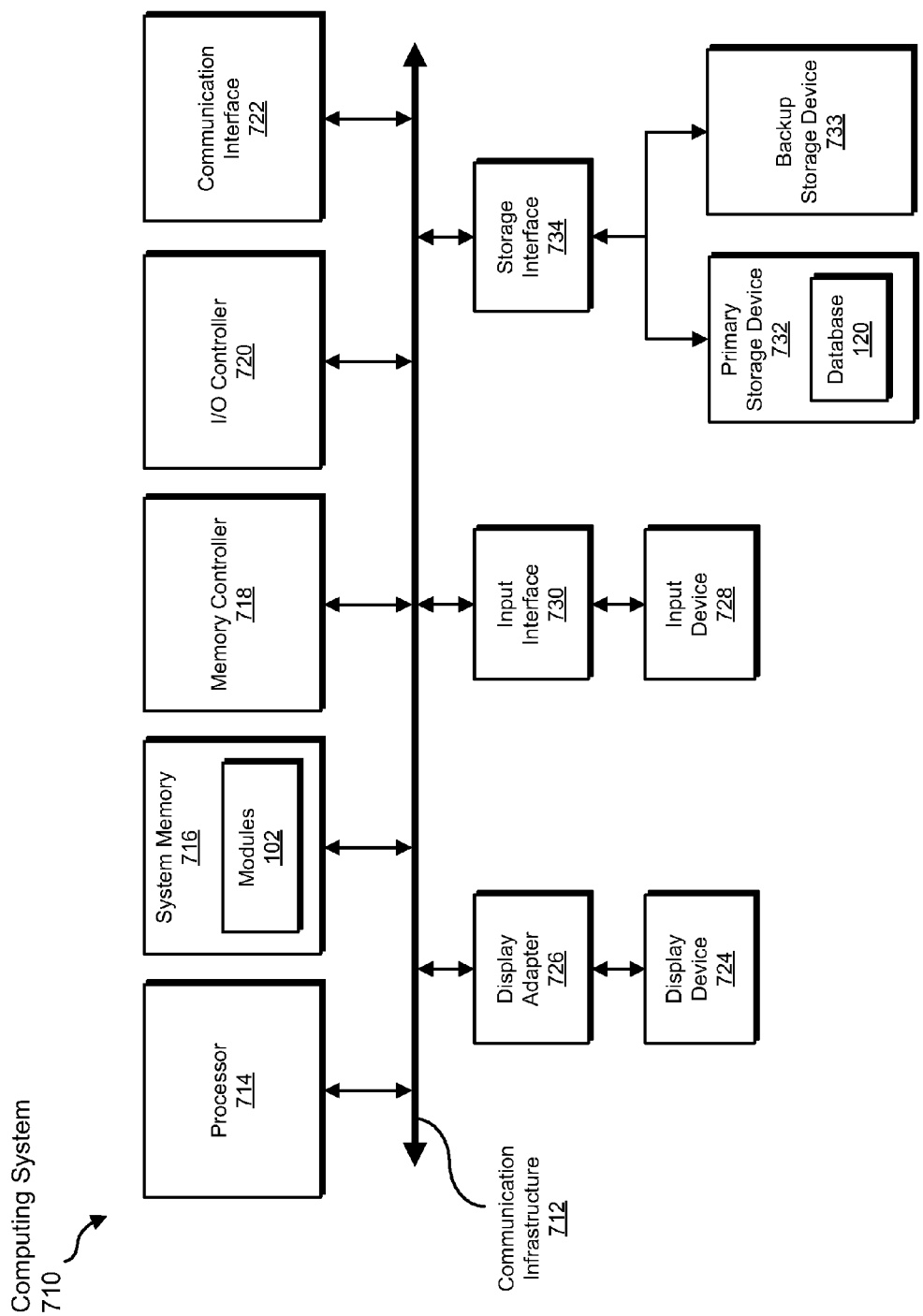
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the training, deploying, identifying, tuning, duplicating, modifying, re-training, and using steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as training, deploying, identifying, tuning, duplicating, modifying, re-training, and using.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the training, deploying, identifying, tuning, duplicating, modifying, re-training, and using steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the training, deploying, identifying, tuning, duplicating, modifying, re-training, and using steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the training, deploying, identifying, tuning, duplicating, modifying, re-training, and using steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the training, deploying, identifying, tuning, duplicating, modifying, re-training, and using steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
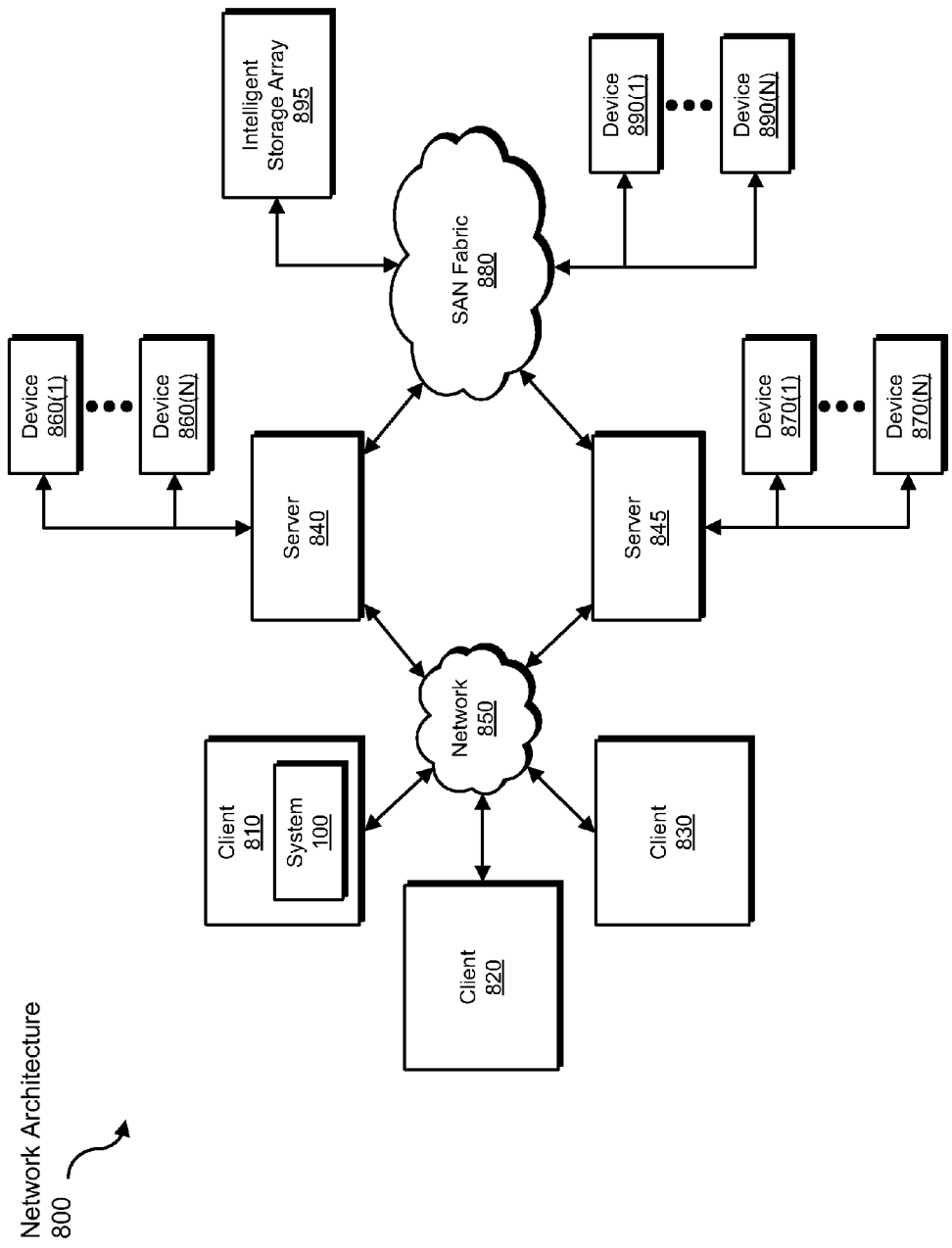
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the training, deploying, identifying, tuning, duplicating, modifying, re-training, and using steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for using multiple in-line heuristics to reduce false positives. In one example, such a method may include: 1) training a first heuristic using a set of training data, 2) deploying the first heuristic, 3) identifying false positives produced by the first heuristic during deployment, 4) modifying the training data to include the false positives produced by the first heuristic, 5) creating a second heuristic using the modified training data, 6) deploying both the first heuristic and the second heuristic, and then 7) applying both the first heuristic and the second heuristic, in sequence, to a set of field data.

In some examples, the method may also include identifying true positives produced by the first heuristic during deployment. In this example, modifying the training data may include modifying the training data to also include the true positives produced by the first heuristic during deployment. In one example, the first and second heuristics may represent malware-detection heuristics, such as malware-detection decision trees.

In some embodiments, creating the second heuristic using the modified training data may include applying a machine-learning technique used to create the first heuristic to the modified training data. In addition, applying both the first heuristic and the second heuristic, in sequence, to the field data may include applying the first heuristic to the field data and then, upon applying the first heuristic, applying the second heuristic to the field data.

In one example, identifying false positives produced by the first heuristic during deployment may include identifying false positives produced when applying the first heuristic to field data. In addition, deploying the second heuristic may include deploying the second heuristic prior to field testing the second heuristic.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, tuning module 110 may transform a property or characteristic of database 120 by modifying and then storing training data 122 (e.g., modified training data 402) in database 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using multiple in-line heuristics to reduce false positives, at least a portion of the method being performed by a computing device comprising at least one processor, the method comprising:
   training a first heuristic using a set of training data;
   deploying the first heuristic;
   identifying false positives produced by the first heuristic during deployment;
   modifying the training data to include the false positives produced by the first heuristic;
   creating a second heuristic using the modified training data;
   deploying both the first heuristic and the second heuristic;
   applying both the first heuristic and the second heuristic, in sequence, to a set of field data.

2. The method of claim 1, further comprising identifying true positives produced by the first heuristic during deployment.

3. The method of claim 2, wherein modifying the training data further comprises modifying the training data to also include the true positives produced by the first heuristic during deployment.

4. The method of claim 1, wherein the first heuristic and the second heuristic comprise malware-detection heuristics.

5. The method of claim 1, wherein the first heuristic and the second heuristic comprise decision trees.

6. The method of claim 1, wherein creating the second heuristic using the modified training data comprises applying a machine-learning technique used to create the first heuristic to the modified training data.

7. The method of claim 1, wherein applying both the first heuristic and the second heuristic, in sequence, to the field data comprises:
   applying the first heuristic to the field data;
   upon applying the first heuristic, applying the second heuristic to the field data.

8. The method of claim 1, wherein identifying false positives produced by the first heuristic during deployment comprises identifying false positives produced when applying the first heuristic to field data.

9. The method of claim 1, wherein deploying the second heuristic comprises deploying the second heuristic prior to field testing the second heuristic.

10. A system for sequentially applying related heuristics to reduce false positives, the system comprising:
    a training module programmed to train a first heuristic using a set of training data;
    a deployment module programmed to deploy the first heuristic;
    an identification module programmed to identify false positives produced by the first heuristic during deployment;
    a tuning module programmed to:
       modify the training data to include the false positives produced by the first heuristic;
       create a second heuristic using the modified training data;
    wherein the deployment module is further programmed to:
       deploy both the first heuristic and the second heuristic;
       apply both the first heuristic and the second heuristic, in sequence, to a set of field data;
    a processor configured to execute the training module, the deployment module, the identification module, and the tuning module.

11. The system of claim 10, wherein the identification module is further programmed to identify true positives produced by the first heuristic during deployment.

12. The system of claim 11, wherein the tuning module is further programmed to modify the training data to also include the true positives produced by the first heuristic during deployment.

13. The system of claim 10, wherein the first heuristic and the second heuristic comprise malware-detection heuristics.

14. The system of claim 10, wherein the first heuristic and the second heuristic comprise decision trees.

15. The system of claim 14, wherein the tuning module creates the second heuristic using the modified training data by applying a machine-learning technique that was used to create the first heuristic to the modified training data.

16. The system of claim 10, wherein the deployment module applies both the first heuristic and the second heuristic, in sequence, to the field data by:
    applying the first heuristic to the field data;
    upon applying the first heuristic, applying the second heuristic to the field data.

17. The system of claim 10, wherein the identification module identifies false positives produced by the first heuristic during deployment by identifying false positives produced when applying the first heuristic to field data.

18. The system of claim 10, wherein the deployment module is further programmed to deploy the second heuristic prior to field testing the second heuristic.

19. A computer-readable medium comprising computer-executable instructions that, when executed by at least one processor of a computing device, cause the computing device to:
    train a first heuristic using a set of training data;
    deploy the first heuristic;
    identify false positives produced by the first heuristic during deployment;
    modify the training data to include the false positives produced by the first heuristic;
    create a second heuristic using the modified training data;
    deploy both the first heuristic and the second heuristic;
    apply both the first heuristic and the second heuristic, in sequence, to a set of field data.

20. The computer-readable medium of claim 19, wherein the first heuristic and the second heuristic comprise malware-detection heuristics.

* * * * *